May 1, 1951 W. G. MARTIN 2,551,217
SILO CONSTRUCTION
Filed April 17, 1946 3 Sheets-Sheet 1

Inventor
Wesley G. Martin
By Elwin A. Andrus
Attorney

May 1, 1951 W. G. MARTIN 2,551,217
SILO CONSTRUCTION
Filed April 17, 1946 3 Sheets-Sheet 3
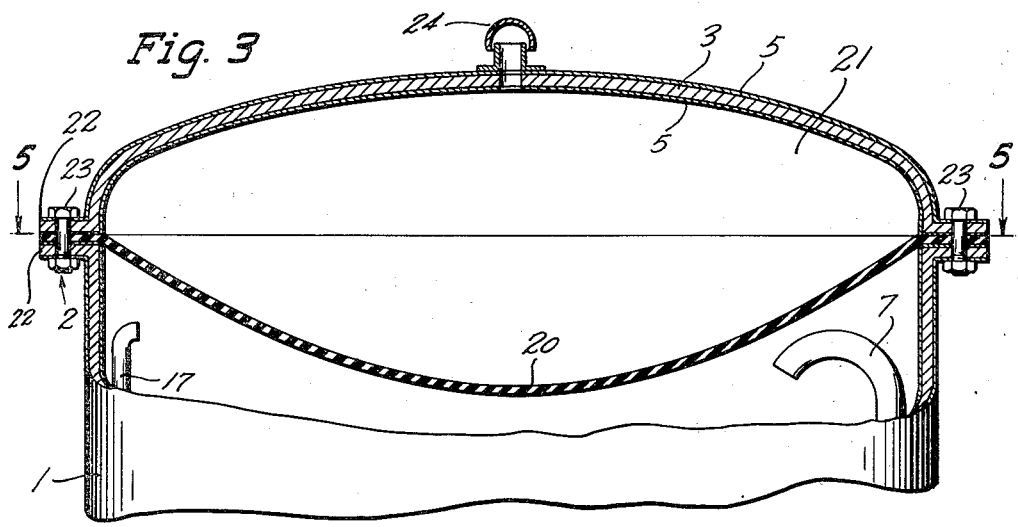
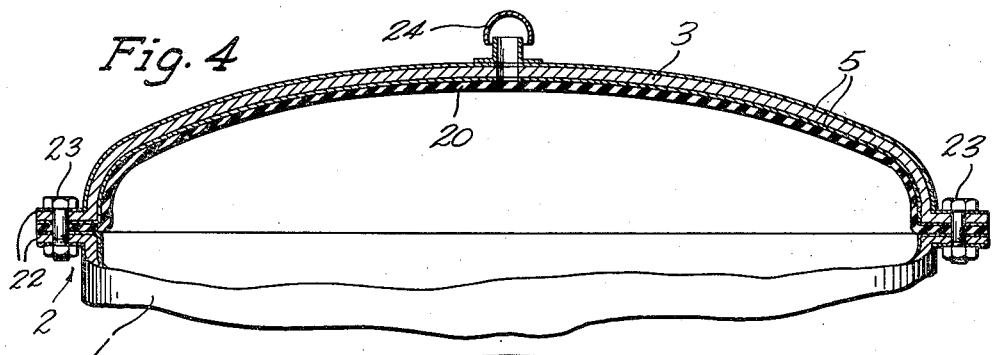
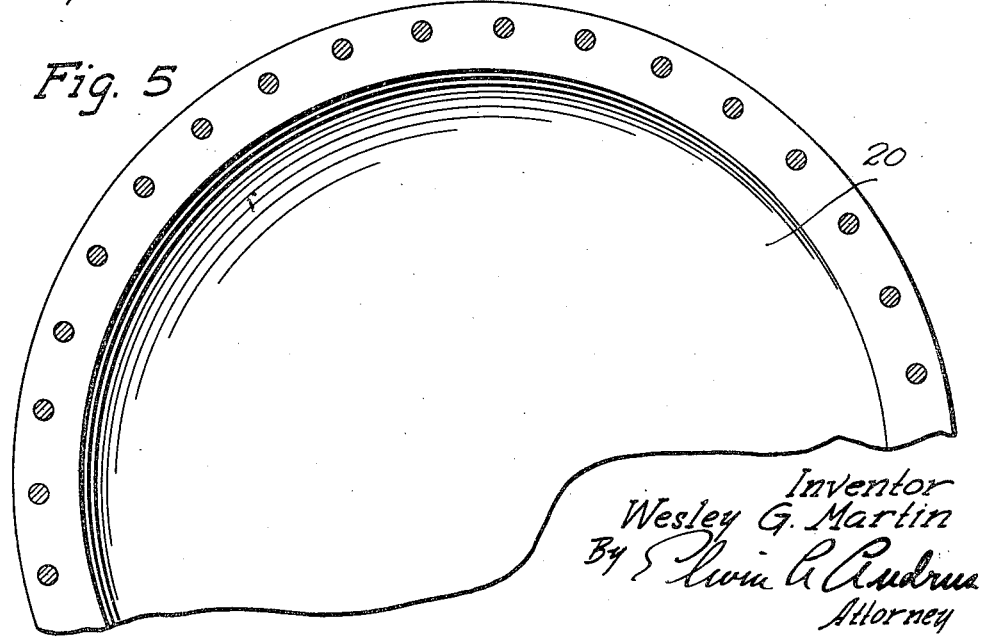
Inventor
Wesley G. Martin
By Elwin G. Andrus
Attorney Patented May 1, 1951

2,551,217

UNITED STATES PATENT OFFICE 2,551,217

SILO CONSTRUCTION

Wesley G. Martin, Milwaukee, Wis., assignor to A. O. Smith Corporation, Milwaukee, Wis., a corporation of New York Application April 17, 1946, Serial No. 662,854

12 Claims. (Cl. 99—235)

1

This invention relates to an improved silo construction and has been employed in connection with a substantially airtight glass-lined steel silo in which the pressure inside the silo is maintained at approximately atmospheric when silage is confined therein.

It has been found that in a silo of generally airtight construction there is a considerable change of temperature between the nighttime and daytime hours. Also there are changes or differences in temperature in such a silo between the various seasons of the year. These differences of temperature, such as between day and night, result in changes in pressure of the atmosphere inside the silo. With these pressure changes the silo is said to breathe so that at certain periods air tends to flow into the silo due to the decrease of pressure within the silo compared to the pressure of the atmosphere outside. At other periods the pressure within the silo is greater than the atmosphere around the silo with the result that air and gases tend to flow out of the silo to the atmosphere.

Under such conditions even in a silo of generally airtight construction there may be pinholes and cracks through which air can flow into the silo and a fresh supply of oxygen would be regularly supplied to the silage. Such a constant flow of oxygen tends to promote mold growth and deterioration of the silage.

The present invention is directed toward a substantially airtight silo in which a pressure or expansion chamber takes care of the tendency of the air to flow in and the gases to flow out of the silo under volume changes of the gases confined in the silo. The pressure chamber employed is one which can vary its volume in order to maintain substantially atmospheric pressure within the silo at all times.

Under the invention such small amounts of oxygen come into the silo that the silage is most perfectly preserved.

The principal object of the invention is to provide a slio in which the pressure inside the silo is maintained at substantially atmospheric at all times regardless of normal volumetric changes.

Another object is to provide a silo in which mold growth with consequent deterioration of the silage is substantially prevented.

A further object is to provide a silo in which provision is made for the silo to breathe without any substantial change in the atmospheric pressure inside the silo and without mixture of air with the gases inside the silo.

2

Another object is to provide a silo in which oxygen-free gas is supplied inside the silo in combination with means for measuring internal pressure.

Another object is to eliminate the necessity of climbing to the top of the silo for locating or adjusting the blower pipe, or for any other reason.

Another object is to facilitate blower filling of an airtight silo.

Another object is to improve the appearance of the silo.

Other objects and advantages of the invention will appear in the following description of an embodiment of the invention illustrated in the accompanying drawings.

In the drawings:

Fig. 3 is an enlarged view, partly in section, of the upper portion of the silo with the diaphragm hanging down within the silo or in a deflated position;

Fig. 4 is a view similar to Fig. 3 with the diaphragm pushed upwardly in an inflated position; and Fig. 5 is a top plan view of the diaphragm in a deflated position.

Figure 1:
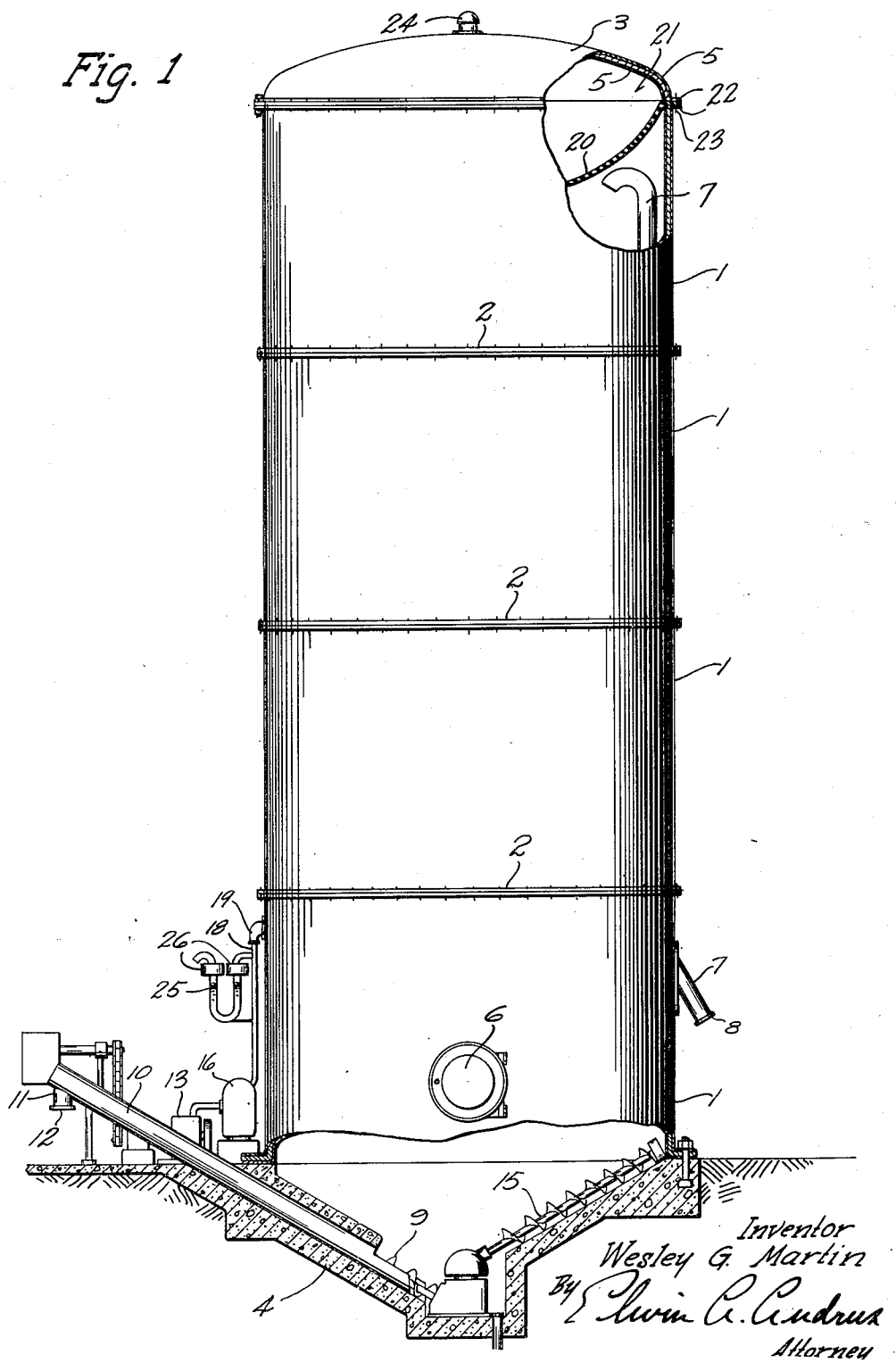
Figure 1 is a longitudinal elevation of a silo with parts broken away and sectioned with the diaphragm in a deflated position.
Figure 2:
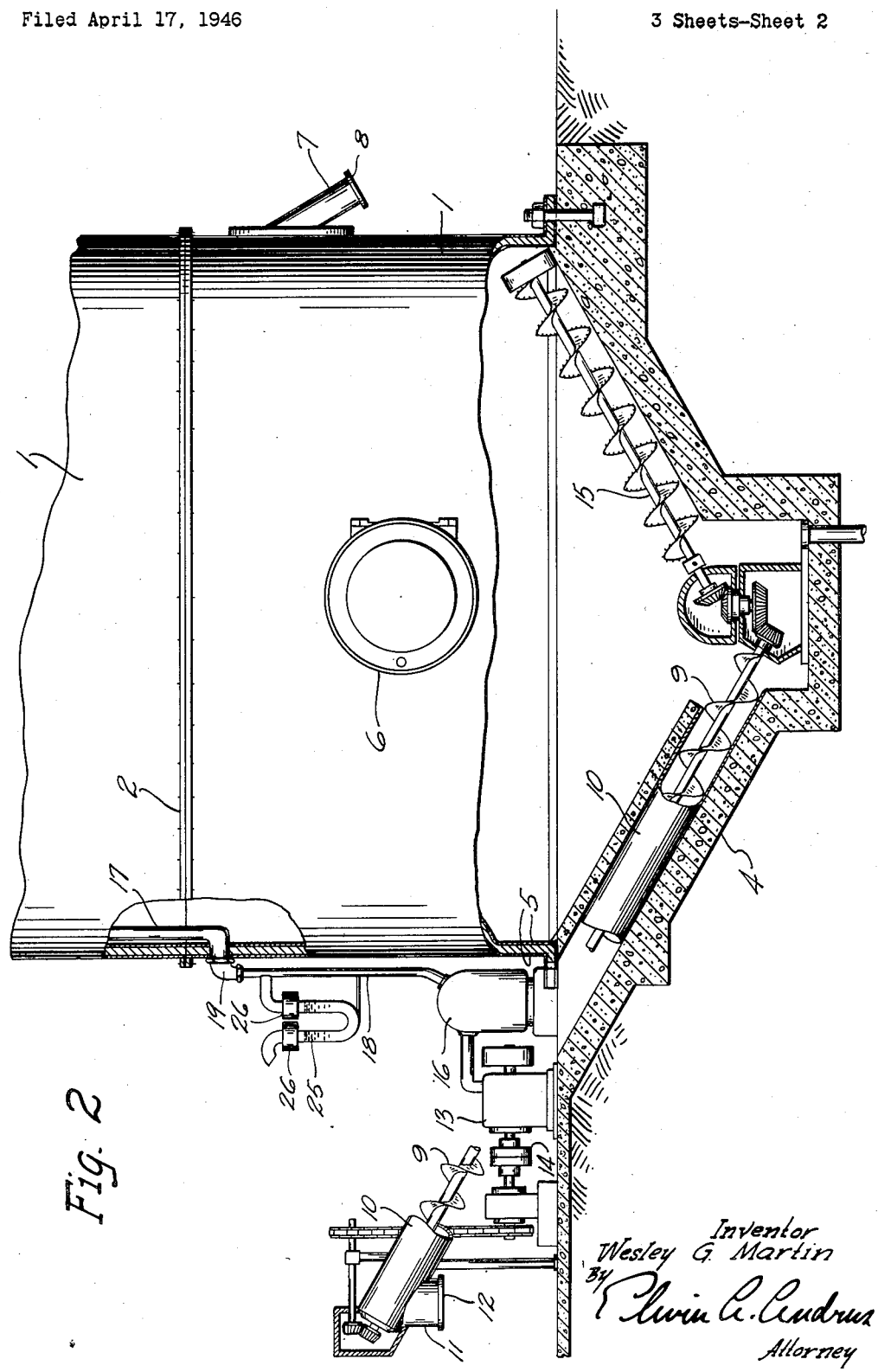
Fig. 2 is an enlarged elevational view, partly in section, of the bottom portion of the silo.

The silo shown in the drawings to illustrate the invention is in general similar to that disclosed and claimed in the application of the present inventor entitled "Silo," Serial No. 598,044, filed June 7, 1945 and assigned to the assignee of the present application. The silo comprises a plurality of cylindrical sections 1 located one on top of the other and secured together at circumferential joints 2. The silo is closed at the top by cover 3 and rests on a conically shaped foundation 4 of cement or the like embedded in the ground a substantial depth beneath the silo shell.

The sections 1 are each of suitable gauge metal rolled to cylindrical shape and welded along a longitudinal seam. Each section 1 is preferably lined upon fabrication with a ceramic enamel coating 5 to protect the metal from corrosion and the coating 5 may also be applied to the outside surface of the silo.

An opening is provided in the bottom section 1 which is closed by airtight door 6 to give access to the inside of the silo for clean-out purposes and the like. The silo filler pipe 7 extends upwardly inside the silo wall and curves inwardly from the wall adjacent the top section 1. The pipe 7 is suitably secured to the silo shell and is closed at the outer end with the airtight cover 8 when not in use. The joint between pipe 7 and the silo wall is also sealed to prevent leakage of air into the silo.

The circumferential joints 2 are constructed in a manner to provide airtight joints between sections 1. The joint construction described and claimed in the application above referred to may well be employed.

The silage is removed from the bottom of the silo by any suitable mechanical means that will prevent flow of air therethrough into the silo when silage is being removed.

The means shown in the drawings is the same as that described and claimed in the application above referred to. An auger or screw 9 extends to the bottom of the silo through a diagonal opening in foundation 4 and the outer end of the auger extending from the foundation is enclosed in casing 10. Silage moved out of the silo by screw 9 is discharged through pipe 11 extending downwardly from the outer end of casing 10. The door 12 is disposed as an airtight closure for pipe 11 when silage is not being discharged.

The screw 9 is rotated by gasoline engine 13 through suitable gearing and a speed reducer 14. The inner end of screw 9 is gear connected to a second auger or screw 15 and the latter is driven around the foundation 4 when screw 9 is rotated by engine 11. The screw 15 also revolves and is formed to cut up and loosen the silage for ready removal by screw 9.

Oxygen-free gas may be supplied to the inside of the silo by the exhaust gases of engine 13. The exhaust gases help prevent entry of air during removal of silage and maintain a favorable pressure condition inside the silo. The employment of the exhaust gases will be described more fully hereinafter.

The exhaust gases of engine 13 are piped through a filter 16 and then are carried to the pipe 17 by the pipe 18. The pipe 17 extends substantially to the top of the silo on the inside of the silo wall and is connected to pipe 18 by coupling 19. Pipe 18 is in turn connected to the engine exhaust manifold through filter 16. Pipe 17 not only serves to carry oxygen free gases into the silo, but when coupling 19 is removed, as at the time of filling the silo, air driven into the silo in the filling operation flows out through pipe 17. When filling is completed coupling 19 is replaced and the exhaust gases can then flow through pipe 17 and 18 from engine 13.

The filter 16 may be constructed to operate as a container to trap condensate from the exhaust gases formed in the passage of the gas through pipes 17 and 18 into the silo. It may also be well to employ a water trap, not shown, in the pipe line after it leaves the filter to catch condensate from the exhaust gases.

The exhaust gases or other gases that are used may be carried into the silo in other ways than that shown and other means for supplying oxygen-free gas may be employed. For example the screw 9 may be driven by an electric motor and nitrogen gas supplied to the silo from a storage tank. The exhaust gases may also be pumped directly into the bottom of the silo.

The exhaust gases from engine 13 or other oxygen-free gases piped into the silo replace in substantially equal volume the volume of silage removed. The engine 13 is provided with a clutch, not shown, so that exhaust gases may be supplied to the silo without driving screw 9.

The silo is provided with an expansion chamber which may be assembled with the silo in a number of different ways. The expansion chamber may be located outside the silo and be connected thereto or be provided inside the silo itself.

One type of expansion chamber construction, as shown in the drawings, which permits the silo to breathe without mixing fresh air with the gases inside the silo, has a diaphragm 20 which hangs loosely suspended within the top of the silo below the silo top 3 to provide chamber 21 therebetween. Diaphragm 20 may be a cloth impregnated with rubber or flexible resin to prevent passage of air therethrough. A thin metal diaphragm might also be employed.

The upper section 1 and the cover 3 are provided with the complementary flanges 22 and the circumferential periphery of diaphragm 20 is secured between flanges 22 when cover dome 3 is assembled on top of the top section 1 and secured thereto by a plurality of bolts 23. Rubber cement or the like may be employed to seal the joint between the top 3 and the upper section 1. The diaphragm is of a size with respect to expansion chamber 21 so that when the diaphragm is up or inflated it will strike the top of the silo before it is under tension. This will conserve the diaphragm.

A weather-proof vent 24, which may comprise a short pipe suitably covered at the outer end for protection from the elements, is secured to top 3 to permit air to flow in and out of chamber 21 formed between diaphragm 20 and top 3.

A relief valve 25 which may be a liquid or mechanical valve is disposed on one side of the silo at a level where it may be readily observed. The valve 25 may be connected to the silo in a number of different ways and is provided to let gases flow out of the silo or air flow into the silo upon increases or decreases of the temperature within the silo effecting extraordinary expansion and contraction of the gases inside the silo.

The relief valve 25 shown in the drawings is a liquid seal and comprises a U-shaped tube of generally large bore connected to the small bore pipe 18 carrying gases from engine 13 to pipe 17 extending upwardly within the silo.

One end of the tube or valve 25 is connected directly into pipe 17 and the other end is turned downwardly and is open. Each side of the U tube 25 is enlarged near the top to provide a chamber 26 for receiving any liquid that would otherwise spill over by reason of increased air or gas pressure. The liquid in the tube is of a non-freeze type, and due to the large bore of the tube, air or gases as the case may be, will bubble through the tube when the liquid is forced substantially fully into either side of the tube.

Under ordinary conditions, as will be described hereinafter, valve 25 will prevent the passage of gases and air therethrough, but it is provided as a safety measure to take care of extraordinary breathing by the silo.

The valve 25, has another function and that is to serve as a pressure indicator to enable the operator to determine whether diaphragm 20 is up or down. If valve 25 is of a construction that it cannot be employed as a pressure indicator then a separate indicator may be installed.

After the silo is initially filled with the fodder which is to be converted into silage, the diaphragm 20 will ordinarily be in a deflated position and hanging down within the silo. Air may flow into the silo through the relief valve 25 for several hours until fermentation builds up the pressure of gases on the inside. Oxygen within the silo is quickly absorbed by the plant cells and then after a few hours large quantities of $CO_2$ begin to be given off and have the effect of purging out any remaining air in the substantially airtight silo that might promote mold growth. The diaphragm 20 is gradually pushed upwards or inflated by the increase and expansion of the gases given off by the fodder being converted into silage. Any excess gas pressure that may be developed within the silo is relieved through relief valve 25, if diaphragm 18 reaches maximum inflation while the gases within the silo are still expanding or increasing in volume.

At the time when silage is to be removed from the silo it may be that due to pressure conditions inside the silo diaphragm 20 will be in a deflated position. This can be observed on relief valve 25. Also when door 12 to discharge pipe 11 is opened pressure inside the silo is released and diaphragm 20 tends to deflate.

The ordinary procedure followed by the operator before removing silage will be to start motor 13 declutched from screw 9 to warm up the engine. As soon as the motor is started exhaust gases are driven into the silo through pipes 18 and 17. The exhaust gases inflate diaphragm 20, should it be deflated, and tend to prevent it from deflating when discharge door 12 is opened.

After engine 13 is warmed up it is clutched to drive screw 9, door 12 is opened, and the screw forces the silage out through discharge pipe 11. After withdrawal of silage is completed door 12 is closed and engine 13 is declutched from screw 9. Relief valve 25 is then observed by the operator. If the liquid level therein indicates that diaphragm 20 is down engine 13 is run to produce exhaust gases which are driven into the silo through pipes 18 and 17. The exhaust gases are forced into the silo until diaphragm 20 is at maximum height or inflated as determined by the level of the liquid in relief valve 25. The cycle of operations here described is ordinarily carried out every time that silage is removed, as the diaphragm 20 should be at maximum height when removal of silage is completed and also should be inflated when silage is being removed, to maintain the atmospheric pressure conditions inside the silo that are desired.

The temperature inside a silo which is constructed to be airtight ordinarily will rise during the day and decrease during the night. As the temperature rises the gases in the silo expand and the pressure inside the silo will rise above atmospheric pressure and the gases will tend to flow out of the silo unless an expansion chamber is provided. When the temperature lowers the gases in the silo contract and the pressure inside the silo will lower below atmospheric pressure and air will tend to flow into the silo unless an expansion chamber is provided. Under these conditions the oxygen tends to promote mold growth, and deterioration of the silage is likely to result. The plant tissue and bacteria cannot use up an unlimited constant supply of oxygen without deterioration of the silage.

Under the present invention, however, the pressure inside the silo proper remains substantially at atmospheric pressure at all times as the expansion device which here is shown as the diaphragm 20 operates to maintain atmospheric pressure within the silo.

Ordinarily during the day diaphragm 20 is inflated as the pressure rises with rise of temperature, and air in chamber 21 is forced out of vent 24. During the night as the temperature lowers the gases within the silo contract and diaphragm 20 is deflated or forced inwardly as air moves through vent 24 into chamber 21. Changes of pressure and the consequent volumetric changes of the gases within the silo under different temperature and barometric conditions is thus taken care of by the diaphragm 20 without permitting air to enter into the silo proper and mix with the gases therein.

The chamber 21 is of large area so that the space traversed by the diaphragm 20 is sufficient to take care of the breathing in a silo when the silo is nearly empty and temperature changes are at a maximum. The diaphragm 20 being of flexible material is capable of moving inwardly of the silo a substantial distance when the air tends to flow into chamber 21. However, relief valve 25 is provided to let air flow into the silo proper under extreme or unusual temperature changes, where the diaphragm would be stretched beyond capacity or possibly under conditions where diaphragm 20 is unable to expand due to contacting the silage at the top of the silo. Under these conditions air would flow into the silo through the valve 25 before the diaphragm 20 would break or the silo collapse.

In the case where the diaphragm may be hampered by the silage when the silo contains a large mass of silage and temperature changes therein are little if any, the complete exclusion of air is not so important as in the case of maximum changes of temperature and a small volume of silage because limited amounts of oxygen can be absorbed and converted into $CO_2$ and $H_2O$ by the plant cells and bacteria without producing mold growth and deterioration of the silage.

The pressure or expansion chamber which may be employed serves to provide an accumulator to maintain atmospheric pressure inside the silo proper at all times so that the oxygen in contact with the silage is positively limited. The airtight construction of the silo insures that the diaphragm will operate effectively and that the oxygen supply inside the silo will be limited to an amount that the plant growth and bacteria will absorb before mold growth can thrive.

The invention provides a silo construction in which entry of air or oxygen is prevented when silage is being removed and during the breathing cycles that the silo goes through under temperature changes between day and night or different seasons of the year. The pressure or expansion chamber insures that the silage will be most perfectly preserved as entry of air into the silo in contact with silage is substantially eliminated.

Various embodiments of the invention may be employed within the scope of the accompanying claims.

I claim:

1. In a storage structure, a silo of airtight construction formed of a generally cylindrical large diameter metal body member closed at the top by a cover having an opening therethrough to the inside of the silo, an expansion chamber in the top of the silo to maintain atmospheric pressure within the silo under all operating conditions and bounded by the top of the silo on one side and on the other side by a substantially flexible impervious diaphragm suspended within the top of the silo and normally spaced inwardly therefrom to separate said silo into a closed inner chamber in which the silage is located and the expansion chamber open to the atmosphere, and said diaphragm being disposed to inflate upon expansion of gases within the silo and deflate upon contraction of the silo gases and flow of air into said expansion chamber to maintain atmospheric pressure within the silo under substantially all operating conditions.

2. In a storage structure, a silo of airtight construction comprising a generally cylindrical large diameter metal body member closed at the top by a cover having an opening therethrough to the inside of the silo, an expansion chamber in the top of the silo to maintain atmospheric pressure within the silo under all operating conditions and bounded by the top of the silo on one side and on the other side by a substantially flexible impervious diaphragm suspended within the top of the silo and normally spaced inwardly therefrom to separate said silo into a closed inner chamber in which the silage is located and the expansion chamber open to the atmosphere, said diaphragm being disposed to inflate upon expansion of gases within the silo and deflate upon contraction of the silo gases and flow of air into said expansion chamber to maintain atmospheric pressure within the silo under substantially all operating conditions, a pipe secured within the silo and projecting from the lower end thereof a source of oxygen-free gas connected to said pipe to introduce oxygen-free gases into said silo to maintain atmospheric pressure within the silo, and a relief valve connected to the extension of said pipe located outside said silo and set for predetermined pressure conditions to release gases from the silo and permit flow of air into the silo under extraordinary breathing of the silo with which the diaphragm expansion chamber is unable to cope.

3. In a storage structure, a silo of airtight construction comprising a generally cylindrical large diameter metal body member closed at the top by a cover having an opening therethrough to the inside of the silo, an expansion chamber in the top of the silo to maintain atmospheric pressure within the silo under all operating conditions and bounded by the top of the silo on one side and on the other side by a substantially flexible impervious diaphragm suspended within the top of the silo and normally spaced inwardly therefrom to separate said silo into a closed inner chamber in which the silage is located and the expansion chamber open to the atmosphere, said diaphragm being disposed to inflate upon expansion of gases within the silo and deflate upon contraction of the silo gases and flow of air into said expansion chamber to maintain atmospheric pressure within the silo under substantially all operating conditions, a pipe secured within the silo and projecting from the lower end thereof, a source of oxygen-free gas connected to said pipe for supplying purging gases within the silo to maintain atmospheric pressure within the silo and purge oxygen therefrom; a relief valve connected to the extension of said pipe located outside said silo and set for predetermined pressure conditions to release gases from the silo and permit flow of air into the silo under extraordinary breathing of the silo with which the diaphragm pressure chamber is unable to cope and means in said valve to indicate whether the said diaphragm is up or down.

4. In a storage structure, a silo of airtight construction formed of a plurality of superimposed cylindrical sections closed at the top by a cover member having an opening to the inside of the silo, a flexible diaphragm suspended from the top of the silo to separate the silo into a chamber in which silage is stored substantially free of contact with air and a chamber open to the air through the opening in said cover, and said diaphragm being subject to inflation by the expansion of gases within the silo and deflation by contraction of the gases within the silo, a pressure indicator connected to the silo, means therein to indicate whether said diaphragm is inflated or deflated, and a source of oxygen-free gas connected to the silo to introduce oxygen-free gas into said silo to inflate said diaphragm if said indicator indicates deflation thereof to thereby maintain substantially atmospheric pressure within the silo and prevent the silo from collapsing or bursting while remaining free of air in contact with the silage.

5. A metal silage storage container of substantially airtight construction formed of a generally cylindrical large diameter body member closed at the top by a cover having an opening therethrough to the inside of the container, a flexible impervious diaphragm suspended beneath said cover and normally spaced therefrom within the top of the container, said diaphragm being of substantially the diameter of the container to separate the same into an inner chamber in which silage is stored free from contact with air and an outer chamber between the diaphragm and cover exposed to the entry of air through the opening in said cover, said diaphragm expanding outwardly of the container under pressure of gases inside the silo and to expand inwardly of the container under pressure of air outside the container to prevent the container from bursting or collapsing under changes of pressure therein, an unloading device connected to the bottom of the container to unload silage from the bottom thereof without any substantial entry of air, and a source of oxygen-free gas connected to the inner chamber of the container to supply oxygen-free gas thereto to inflate said diaphragm upon loss of pressure upon the removal of silage.

6. A metal silage storage container of substantially airtight construction formed of a generally cylindrical large diameter body member closed at the top by a cover member having an opening therethrough to the inside of the container, a flexible impervious diaphragm suspended beneath said cover and normally spaced therefrom within the top of the container, said diaphragm being of substantially the diameter of the container to separate the same into an inner chamber in which silage is stored free from contact with air and an outer chamber between the diaphragm and cover exposed to the entry of air through the opening in said cover, said diaphragm expanding outwardly of the container under pressure of gases inside the silo and to expand inwardly of the container under pressure of air outside the container to prevent the container from bursting or collapsing under changes of pressure therein, an unloader connected into the bottom of the container, a gasoline engine connected to the unloader to drive the same for removal of silage from the bottom of the silo, and a connection between the exhaust of the engine and the inner chamber of the silo to carry exhaust gases thereto to maintain the diaphragm inflated during removal of silage and prevent any substantial entry of air or to inflate the diaphragm if the same is deflated.

7. A metal silage storage container of substantially airtight construction, an auxiliary pressure accumulator bounded by a solid structure open on one side to the atmosphere for receiving air forced therein by atmospheric pressure and having an expansion member exposed to gases on the inside of the container and the air in the chamber on the other side, said expansion member being operated by the pressure of the gases on the inside of the container and the air on the outside to decrease or increase, respectively, the capacity of the chamber for holding air to keep the container from bursting or collapsing under changes in pressure, an unloading device connected to the bottom of the container to unload silage from the bottom thereof without any substantial entry of air, and a source of oxygen-free gas connected to the inside of the container to supply oxygen-free gas thereto to expand the expansion member upon loss of pressure in the container upon the removal of silage.

8. A metal silage storage container of substantially airtight construction, an auxiliary pressure accumulator bounded by a solid structure open on one side to the atmosphere for receiving air forced therein by atmospheric pressure and having an expansion member exposed to gases on the inside of the container and the air in the chamber on the other side, said expansion member being operated by the pressure of the gases on the inside of the container and the air on the outside to decrease or increase, respectively, the capacity of the chamber for holding air to keep the container from bursting or collapsing under changes in pressure, an unloading device connected to the bottom of the container to unload silage from the bottom thereof without any substantial entry of air, a gasoline engine connected to the unloading device to drive the same, and a connection between the exhaust of the engine and the container to carry exhaust gases thereto to maintain the expansion member expanded during removal of silage and prevent any substantial entry of air or to expand the expansion member should the same contract in service.

9. In combination, a thin walled metal air tight silo structure of generally large upright cylindrical construction with a closed top therefor and subject to collapse or rupture under a small pressure differential between the outside and inside thereof, a foundation supporting said structure and closing the bottom thereof, a normally closed inlet for filling the structure with material to be stored therein, a normally closed discharge opening at the bottom of the structure for periodic removal of material stored therein, said silo structure being normally exposed to the out-of-doors and subject to breathing under conditions of temperature change between day and night and between seasons of an order capable of collapsing or rupturing the same, said silo structure having a bleeder opening therein normally opening above the level of material in the silo, and a flexible walled expansion member secured to said structure and sealing said bleeder opening to thereby separate the gases enveloping the material in the silo from the atmosphere, said expansion member constituting at least a part of an expansion chamber free to expand and contract in volume under differences in pressure between the gases inside the silo and the atmosphere, whereby the silo structure is protected from injury and the maintaining of an air tight silo structure is facilitated at all times.

10. In combination, a thin walled sheet metal air tight silo of the class described constructed of metal sheets of a thickness and weight generally incapable of withstanding the maximum pressure variations in the free gas space of the silo during normal use thereof, said silo having sealed joints between the sheets and being adapted to be exposed to varying temperature conditions of the outside atmosphere tending to vary the pressure conditions of the free gas space above the stored material within the silo to the point of rupture or collapse, and a flexible tension member sealing an opening in said silo and disposed to be subject on one side to the pressure in the free gas space of said silo and on the other side to atmospheric pressure, said flexible member providing a volumetric expansion and contraction for the free gas space of said silo of sufficient capacity to compensate for normal variations in volume thereof at substantially atmospheric pressure, whereby the free gas space of said silo is maintained at substantially atmospheric pressure throughout the normal use cycle of the silo and any tendency for breathing of air to and from the material stored in the silo is reduced to a minimum.

11. In combination, a thin walled sheet metal air tight silo of the class described constructed of metal sheets of a thickness and weight generally incapable of withstanding the maximum pressure variations in the free gas space of the silo during normal use thereof, said silo having sealed joints between the sheets and being adapted to be exposed to varying temperature conditions of the outside atmosphere tending to vary the pressure conditions of the free gas space above the stored material within the silo to the point of rupture or collapse, a flexible tension member sealing an opening in said silo and disposed to be subject on one side to the pressure in the free gas space of said silo and on the other side to atmospheric pressure, said flexible member providing a volumetric expansion and contraction for the free gas space of said silo of sufficient capacity to compensate for normal variations in volume thereof at substantially atmospheric pressure, whereby the free gas space of said silo is maintained at substantially atmospheric pressure throughout the normal use cycle of the silo and any tendency for breathing of air to and from the material stored in the silo is reduced to a minimum, and relief valve means connected to the silo and constructed to relieve emergency pressure conditions within the silo both positive and negative with respect to the atmosphere to protect the thin sheets of the silo against emergency loads beyond the compensating capacity of said expansion member and of an order capable of collapsing or bursting the silo.

12. In combination, an upright cylindrical air tight silo structure adapted to receive and store crop materials, a foundation supporting said silo structure and closing the bottom thereof, a discharge opening at the bottom of the structure for periodic partial removal of the material stored therein, mechanical means at the bottom of the structure for removing material through said opening, means to close said discharge opening between periods of removal of material, and a flexible expansion member connected to the silo structure and sealing a second opening therein to thereby separate the gases enveloping the stored material from the atmosphere, said expansion member providing an expansion chamber freely expansible and contractible under small differences in pressure between said gases and the atmosphere, whereby removal of material from the silo is facilitated without tending to cause excess leakage of air into the structure during such removal.

WESLEY G. MARTIN.

REFERENCES CITED

The following references are of record in the file of this patent:

UNITED STATES PATENTS

| Number | Name | Date |
|---|---|---|
| 832,581 | Kowarsch | Oct. 2, 1906 |
| 1,145,550 | Brown | July 6, 1915 |
| 1,275,558 | Holmgreen | Aug. 13, 1918 |
| 1,390,341 | Cushing | Sept. 13, 1921 |
| 1,641,340 | Mabee | Sept. 6, 1927 |
| 1,671,118 | Mabee | May 29, 1928 |
| 1,950,327 | Punte | Mar. 6, 1934 |
| 1,981,433 | Shodron | Nov. 20, 1934 |
| 2,040,798 | Schoonmaker | May 12, 1936 |
| 2,094,619 | Reichert et al. | Oct. 5, 1937 |
| 2,094,904 | Princell | Oct. 5, 1937 |
| 2,305,423 | Heuser | Dec. 15, 1942 |
| 2,458,360 | Fay et al. | Jan. 4, 1949 |